(12) United States Patent
Okunev et al.

(10) Patent No.: US 6,542,551 B1
(45) Date of Patent: Apr. 1, 2003

(54) TRANSLATION TABLE AND CONSTELLATION DESIGN FOR A PCM MODEM SUBJECTED TO ALTERNATING ROBBED BIT SIGNALING

(75) Inventors: Yuri Okunev, Southbury, CT (US); Vitaly Drucker, Stamford, CT (US); Qin Wang, Bristol, CT (US); Yuri Goldstein, Southbury, CT (US)

(73) Assignee: PC Tel, Inc., San Jose, CA (US)

( * ) Notice: Subject to any disclaimer, the term of this patent is extended or adjusted under 35 U.S.C. 154(b) by 0 days.

(21) Appl. No.: 09/315,475

(22) Filed: May 20, 1999

(51) Int. Cl.$^7$ .............................. H04B 14/04; H04J 3/12
(52) U.S. Cl. ..................................... 375/242; 370/523
(58) Field of Search ............................... 375/222, 242; 332/106, 107; 370/523

(56) References Cited

U.S. PATENT DOCUMENTS

| | | | |
|---|---|---|---|
| 5,394,437 A | 2/1995 | Ayanoglu et al. | 375/222 |
| 5,406,583 A | 4/1995 | Dagdeviren | 375/5 |
| 5,528,625 A | 6/1996 | Ayanoglu et al. | 375/222 |
| 5,822,371 A | 10/1998 | Goldstein et al. | 375/242 |
| 5,825,816 A | 10/1998 | Cole et al. | 375/222 |
| 5,825,823 A | 10/1998 | Goldstein et al. | 375/286 |
| 5,862,179 A | 1/1999 | Goldstein et al. | 375/242 |
| 5,862,184 A | 1/1999 | Goldstein et al. | 375/295 |
| 5,995,558 A | * 11/1999 | Betts et al. | 370/523 |
| 6,118,813 A | * 9/2000 | Lai | 375/231 |
| 6,212,207 B1 | * 4/2001 | Nicholas | 370/523 |
| 6,266,382 B1 | * 7/2001 | Lai | 370/523 |

FOREIGN PATENT DOCUMENTS

WO PCT/US95/15924 12/1995

OTHER PUBLICATIONS

ITU–T Recommendation V.34, 9/94, "Data Communication Over the Telephone Network".

"The Capacity of PCM Voiceband Channels", Kalet, et al., IEEE Intern'l Conference on Communications'93, pp. 507–511.

"A Mathematical Theory of Communication". Bell Systems Technical Journal, 27:379–423, 623–656.

ITU–Telecommunications Standardization Sector, Draft Recommendation "A Digital modem and Analogue modem pair for use on the PSTN at Data Signalling rates of up to 56000 bit/s downstream and up to 33600 bit/s upstream"V.90, pp. 1–50, May 6, 1998.

* cited by examiner

Primary Examiner—Stephen Chin
Assistant Examiner—Kevin Kim
(74) Attorney, Agent, or Firm—David P. Gordon; David S. Jacobson; Thomas A. Gallagher

(57) ABSTRACT

The receiver of a PCM modem utilizes the V.90 $TRN_{1d}$ training signal for detecting whether any of the six slots of the received signal may be subject to alternating robbed bit signaling (ARBS), and what the alternating robbed bit signaling pattern may be. This is accomplished by accumulating the received level over a plurality of frames for each slot and by comparing the received levels for each slot to an average level for that slot. If the difference between the received levels and the average levels exceeds a threshold, the slot is determined to be subject to ARBS. Where a slot is subject to ARBS, DIL sequence signals for frames of the alternating robbed bit signaling slot having LSB=0 and LSB=1 are accumulated separately (if available) in order to generate two translation tables (TRT0, TRT1) for that slot. Where the DIL sequence is found only in the frames having the alternating robbed bit signaling slot having LSB=0 or having LSB=1, only one translation table can be generated. Different algorithms are provided for designing a constellation for the alternating robbed bit signaling slot depending on (a) whether two translation tables were generated for the slot, (b) whether the frame-to-TRT correspondence is known, and (c) where only one translation table is generated, whether the translation table generated was TRT0 or TRT1.

38 Claims, 7 Drawing Sheets

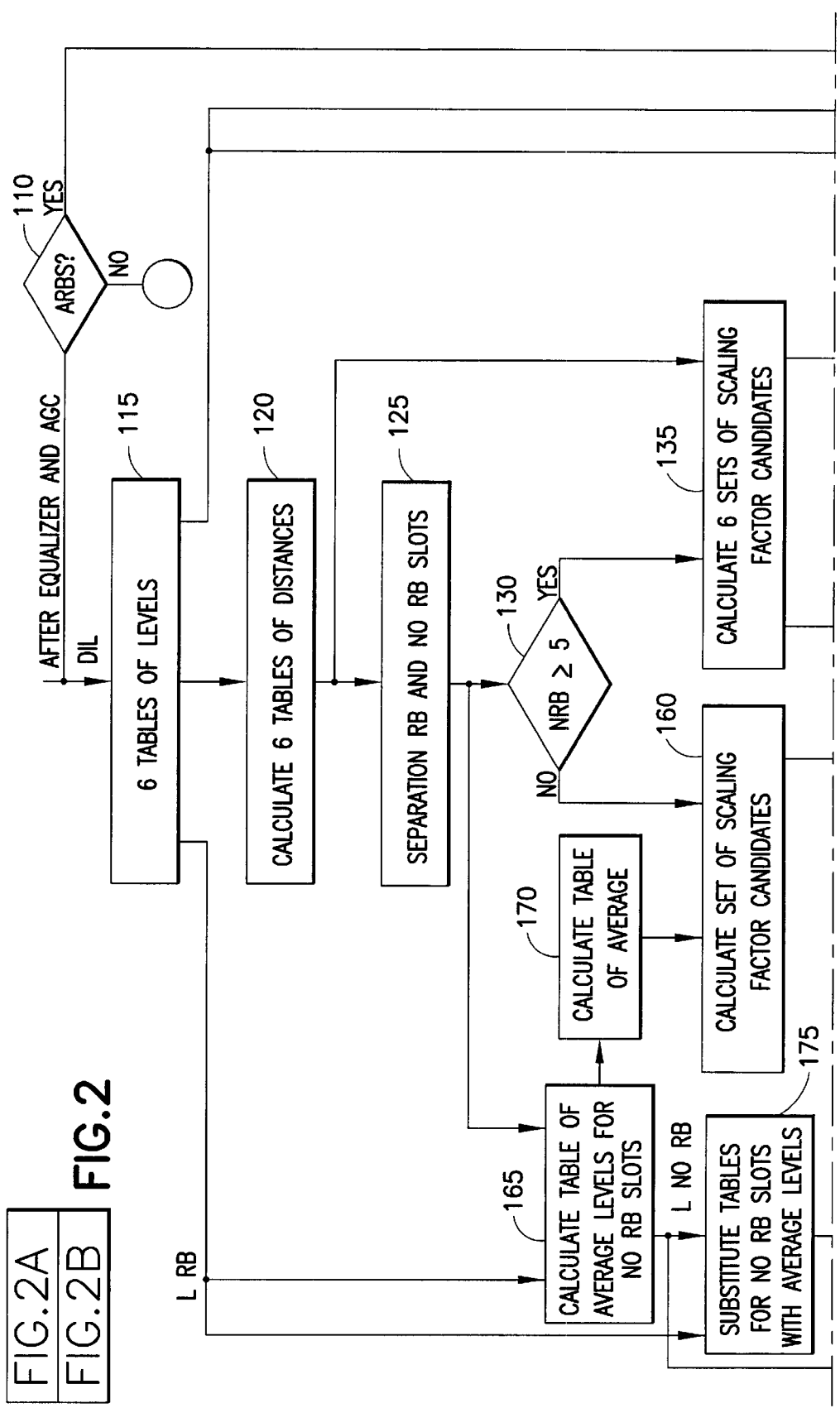

| Ucode | μ-LAW | TRT0 | μ-LAW | TRT1 |
|---|---|---|---|---|
| 53 | 311 | 219 | 311 | 211 |
| 54 | 327 | 247 | 327 | 231 |
| 55 | 343 | 247 | 343 | 231 |
| 56 | 359 | 247 | 359 | 231 |
| 57 | 375 | 279 | 375 | 263 |
| 58 | 391 | 279 | 391 | 263 |
| 59 | 407 | 311 | 407 | 295 |
| 60 | 423 | 311 | 423 | 295 |
| 61 | 439 | 311 | 439 | 295 |
| 62 | 455 | 343 | 455 | 327 |
| 63 | 471 | 343 | 471 | 327 |
| 64 | 495 | 343 | 495 | 327 |
| 65 | 527 | 375 | 527 | 359 |
| 66 | 559 | 407 | 559 | 391 |
| 67 | 591 | 439 | 591 | 423 |
| 68 | 623 | 439 | 623 | 423 |
| 69 | 655 | 471 | 655 | 455 |
| 70 | 687 | 527 | 687 | 495 |
| 71 | 719 | 527 | 719 | 495 |
| 72 | 751 | 527 | 751 | 495 |
| 73 | 783 | 591 | 783 | 559 |
| 74 | 815 | 591 | 815 | 559 |
| 75 | 847 | 591 | 847 | 559 |
| 76 | 879 | 655 | 879 | 623 |
| 77 | 911 | 655 | 911 | 623 |
| 78 | 943 | 655 | 943 | 623 |
| 79 | 975 | 719 | 975 | 687 |
| 80 | 1023 | 719 | 1023 | 687 |
| 81 | 1087 | 783 | 1087 | 751 |
| 82 | 1151 | 847 | 1151 | 815 |
| 83 | 1215 | 847 | 1215 | 815 |
| 84 | 1279 | 911 | 1279 | 879 |
| 85 | 1343 | 975 | 1343 | 943 |
| 86 | 1407 | 975 | 1407 | 943 |

FIG.5c

TRANSLATION TABLE AND CONSTELLATION DESIGN FOR A PCM MODEM SUBJECTED TO ALTERNATING ROBBED BIT SIGNALING

The present invention is related to co-owned U.S. Ser. No. 08/801,066 now issued as U.S. Pat. No. 5,822,371, U.S. Ser. No. 08/807,955 now issued as U.S. Pat. No. 5,862,179, U.S. Ser. No. 08/838,367 now issued as U.S. Pat. No. 5,862,184, U.S. Ser. No. 08/851,597 now issued as U.S. Pat. No. 5,825,816, U.S. Ser. No. 08/870,684 now issued as U.S. Pat. No. 5,825,823, U.S. Ser. No. 09/238,319 filed Jan. 28, 1999, U.S. Ser. No. 09/238,320 filed Jan. 28, 1999, U.S. Ser. No. 09/238,321 filed Jan. 28, 1999, and U.S. Ser. No. 09/238,302 filed Jan. 28, 1999, all of which are hereby incorporated by reference herein in their entireties.

BACKGROUND OF THE INVENTION

1. Field of the Invention

The present invention relates to data communications equipment. More particularly, the present invention relates to translation tables and constellation designs for a PCM modem and methods of generating the same.

2. State of the Art

With the ever-increasing importance of telecommunications for the transfer of data as well as voice, there has been a strong effort to increase data transfer rates over the telephone wires. In 1994, the ITU-T adopted the V.34 Recommendation (International Telecommunication Union, Telecommunication Standardization Sector Recommendation V.34, Geneva, Switzerland 1994). The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, even as the V.34 standard was being adopted, there was a thrust to provide additional standards recommendations which would increase data transfer rates even further.

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation technology for upstream communications.

Recently, a new Recommendation for standard was adopted by the ITU-T for the purposes of standardizing a PCM-type modem. The new standard, known as "V.90", which is hereby incorporated by reference herein in its entirety, relates primarily to the transmitter of a PCM-type modem. In Section 8.4.5, the V.90 Standard requires a two-level training signal $TRN_{1d}$ which is utilized for modem equilization. In Section 8.4.1, the V.90 Standard requires the provision of a probing signal; also known in the art as digital impairment learning or "DIL". The purpose of the DIL is to give the receiver of the receiving (analog) modem the opportunity to measure network impairments. The measurements and determinations made by the receiving modem are used by the receiving modem in formulating an appropriate constellation for the transfer of data. The constellation formulated by the receiving modem is transmitted back to the transmitting modem as a DIL descriptor set forth in Section 8.3.1 of the V.90 standard.

While much attention has been paid in the prior art to the transmitter in the V.90 modem, it will be appreciated that ability to design an appropriate transmission constellation plays a critical role in producing a high quality modem. In particular, according to V.90, the transmitter transmits 8-bit binary numbers (octets) which correspond to 128 positive and 128 negative $\mu$-law or A-law levels. These octets go through the digital network and are finally transformed into analog levels in a digital-to-analog (D/A) converter in the central office. To maximize data rates in the presence of network impairments, an optimal signal constellation must be utilized. Thus, it is necessary to relate (correspond) the transmitted octets to the levels received at the D/A output. This relation or correspondence is accomplished by reference to a translation table. Determination of the translation table is not a trivial task because the digital channel has uncertain parameters and the PCM signal is subjected to both digital and analog distortions including digital attenuation (PAD), robbed bits, etc. In fact, even the distortion may not be regular from frame to frame, as there exists a robbed bit signaling convention known as alternating robbed bit signaling (ARBS) where a slot is subjected to robbed bit signaling one, two or three times during four frames (alternating robbed bit signaling having a four frame periodicity). Regardless, preparation of an appropriate translation table is critical to the high-quality functioning of the data communications. In addition, the translation table is necessary for generating an appropriate constellation design.

SUMMARY OF THE INVENTION

It is therefore an object of the invention to provide methods for generating translation tables in the receivers of PCM modems, and apparatus which utilize the methods.

It is another object of the invention to provide methods for generating translation tables in the receivers of PCM modems where account is made for digital and analog impairments, and in particular account is made for alternating robbed bit signaling.

If is a further object of the invention to provide methods of designing one or more constellations based on translation table determinations.

In accord with the objects of the invention, the receiver of PCM modem of the invention utilizes the V.90 $TRN_{1d}$ training signal for detecting whether any of the six slots of the received signal may be subject to alternating robbed bit signaling (ARBS), and what the alternating robbed bit signaling pattern may be. This is preferably accomplished by accumulating the received level over a plurality of frames for each slot and by comparing the received levels for each slot to an average level for that slot. If the difference between the received levels and the average levels exceeds a threshold, the slot is determined to be subject to ARBS.

According to another aspect of the invention, where a slot is subject to ARBS, DIL sequence signals for frames of the alternating robbed bit signaling slot having LSB=0 and LSB=1 are accumulated separately in order to generate two translation tables (TRT0, TRT1) for that slot. Where the DIL sequence is found only in the frames having the alternating robbed bit signaling slot having LSB=0 or having LSB=1, only one translation table can be generated.

According to a further aspect of the invention, different algorithms are provided for designing a constellation for the alternating robbed bit signaling slot depending on (a) whether two translation tables were generated for the slot, (b) whether the frame-to-TRT correspondence is known, and (c) where only one translation table is generated, whether the translation table generated was TRT0 or TRT1. Where two translation tables were generated, and the frame-to-TRT correspondence is known, constellation points are selected utilizing a minimum distance (dmin) between levels of table TRT1. The Ucodes for the selected levels in TRT1 are used to identify selected levels from table TRT0. Constellation points are selected until the average power of the transmitted signal for the alternating robbed bit signaling slot (including both sets of selected levels) exceeds a given threshold. As a result, a single set of Ucodes for the alternating robbed bit slot is provided for the transmitting modem, while two sets of references are provided for the receiving modem.

Where two translation table were generated, but the frame-to-TRT correspondence is not known, a first constellation point is selected from table TRT1 utilizing the required minimum distance (dmin) between levels of table TRT1. The Ucode for the selected level in TRT1 is used to identify a selected level from table TRT0. The next constellation point in TRT is selected by finding the next constellation point in table TRT1 a minimum distance from the previous selected level in table TRT0. The Ucode for that next selected point is used to identify another selected level from table TRT0. Additional constellation points are selected in this manner until the average power of the transmitted signal for the alternating robbed bit signaling slot (including both sets of selected levels) exceeds a given threshold. As a result, a single set of Ucodes for the alternating robbed bit slot is provided for the transmitting modem, while two sets of references are provided for the receiving modem. However, since the two sets of references cannot be correlated to the received frames, a double decision is required by the receiving modem.

Where only a single translation table is generated, a constellation is designed using only that translation table. The result is a set of Ucodes for the transmitter and a first set of references for the receiver. Then, for each level from the first set of references, the same level is found in a $\mu$-law table. If the translation table available is TRT0, the next smaller level in the $\mu$-law table is taken as a point for the second set of references; whereas, if the translation table available is TRT1, the next larger level in the $\mu$-law table is taken as a point for the second set of references. The selection of the constellation levels continues until the average power of transmitted signals for the alternating robbed bit slot exceeds a given threshold.

Additional objects and advantages of the invention will become apparent to those skilled in the art upon reference to the detailed description taken in conjunction with the provided figures.

BRIEF DESCRIPTION OF THE DRAWINGS

FIG. 5c is a table illustrating first and second embodiments of generating a constellation design from a single translation table generated for an alternating robbed bit slot.

DETAILED DESCRIPTION OF THE PREFERRED EMBODIMENTS

Figure 1:
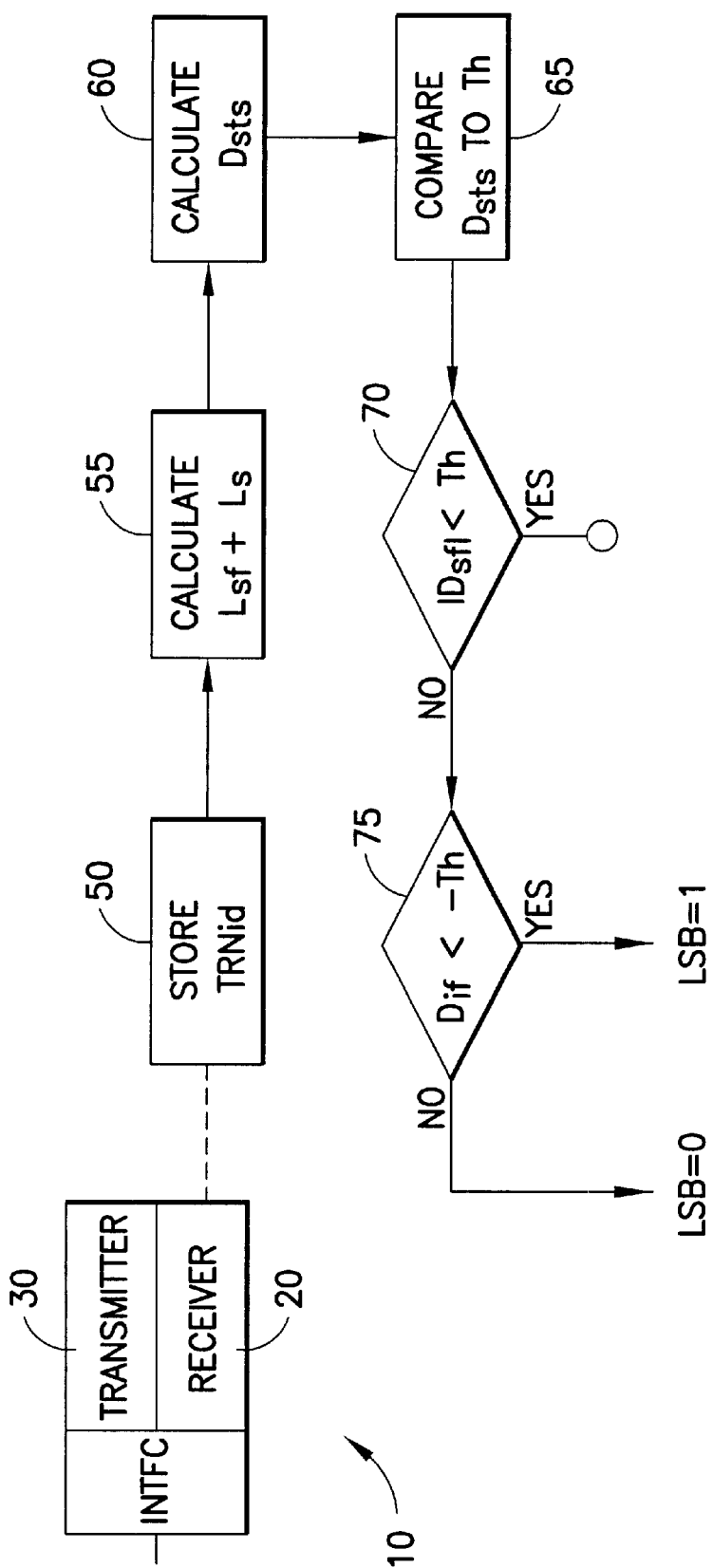
FIG. 1 is a partial block diagram and partial flow diagram of the preferred apparatus and method of the invention for finding the robbed bit pattern of an alternating robbed bit slot.

As seen in FIG. 1, a PCM modem 10 has a receiver 20 and a transmitter 30. According to the V.90 Standard, the receiver 20 receives a two-level V.90 $TRN_{1d}$ training signal which is used for equilization. According to the invention, the two-level V.90 $TRN_{1d}$ signal is also processed in order to detect whether any of the six slots of the received signal may be subject to alternating robbed bit signaling (ARBS), and what the ARBS pattern may be. In particular, at 50 at least a portion of the $TRN_{1d}$ signal is preferably stored in memory of the modem 10. Ideally, the $TRN_{1d}$ signals are received for all slots in at least four consecutive frames. If Li is the i'th received signal, where i=0,1,2, . . . ,N=24n+23, and i=0 corresponds to a first signal (i.e., in frame f=0) in a first slot (i.e., in slot s=0), then $$L_{sf} = \frac{1}{(n+1)} \sum_{j=0}^{n} |L_{24j+s+6f}|$$

where $L_{sf}$ is the average received level of the s-th slot (s=0,1,2,3,4,5) within the f-th frame (f=0,1,2,3). As a result, twenty-four values of $L_{sf}$ are obtained, or four $L_{sf}$ values for each slot. The average value for a particular slot is $$L_s = \sum_{f=0}^{3} L_{sf}/4.$$

Thus, at 55, both $L_{sf}$ and $L_s$ are calculated. At 60, four differences $D_{sf}=L_{sf}-L_s$ for each slot are calculated. At 65, the differences $D_{sf}$ are compared with a threshold Th which may be empirically calculated and which generally depends on PAD attenuation and transmitted level. For example, for any transmit level, a corresponding distance $d_\mu$ between $\mu$-law values is available. A threshold can then be calculated according to Th=$Cd_\mu S$, where C is a empirically determined constant (e.g., 0.25), and S is a scaler dependent on PAD attenuation (e.g., S=1 for PAD=0 dB, and S=0.5 for PAD=−6 dB). Thus, for a transmit level of 943, the corresponding distance $d_\mu$ is 32, and the threshold Th=8 for PAD=0 dB, and Th=4 for PAD=−6 dB. If all four differences $D_{sf}$ for a given slot s satisfy the inequality $|D_{sf}|<$Th as indicated at 70, then there is no alternating robbed bit pattern in that slot. On the other hand, if one or more difference $D_{sf}$ in a slot satisfies the inequality $|D_{sf}|>$Th, then there is an alternating RB pattern in that slot. As seen at 75, if for that slot, in a particular frame $D_{sf}<-$Th, the robbed bit pattern for that frame is LSB=1. Likewise, if for that slot, in a particular frame $D_{sf}>$Th, the robbed bit pattern for that frame is LSB=0. As previously mentioned, alternating robbed bit signalling has a pattern with a four frame periodicity. Thus, a slot can have various robbed bit patterns. For example, a slot can have an LSB pattern of 1100 with the first and second frames having LSB=1 and the third and fourth frames having LSB=0. Other ARBS patterns include 1010, 0101, 0011, 0110, 0001, 0100, 0111, 1110, etc.

Figure 2B:
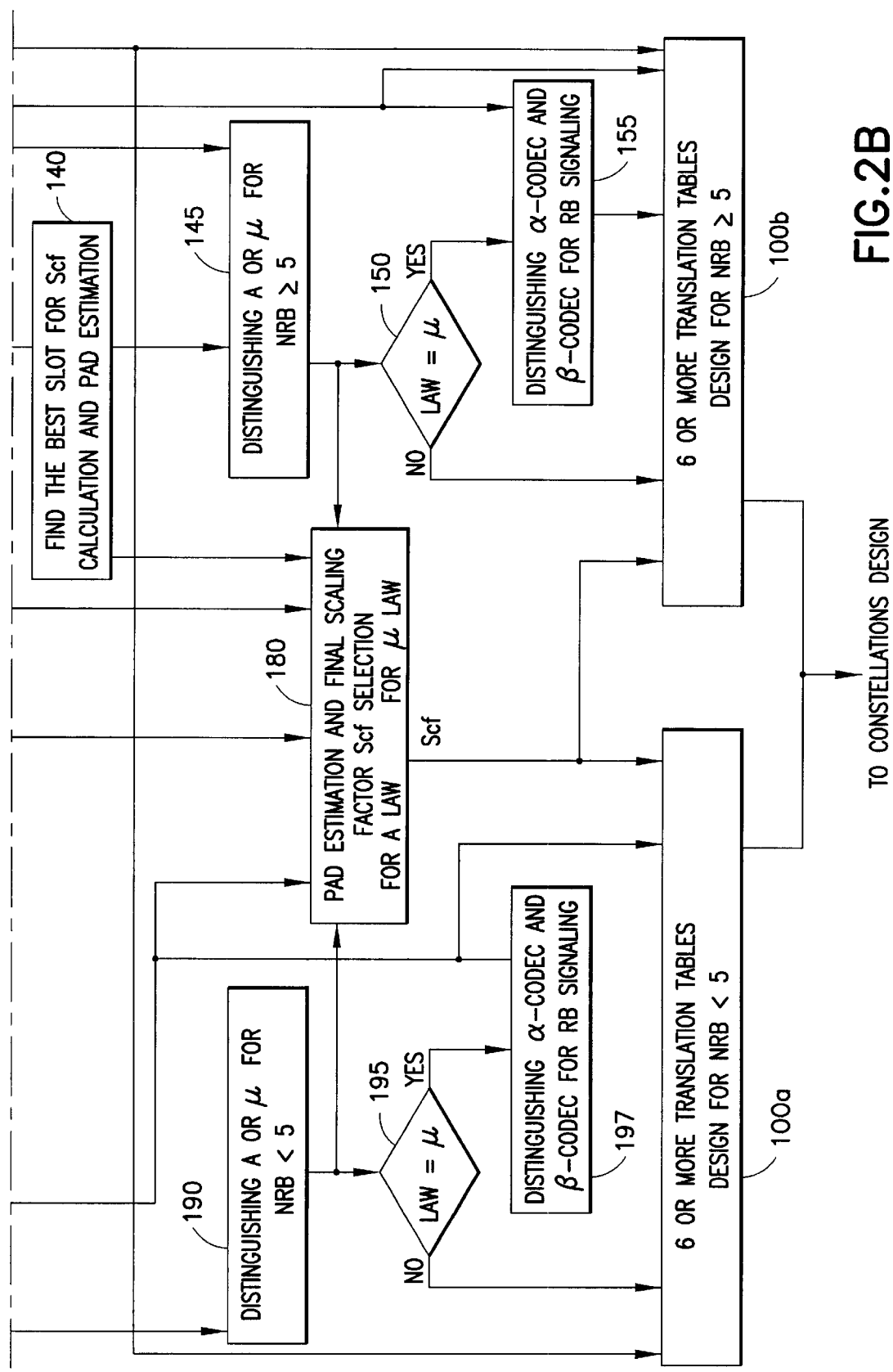
FIG. 2 is a flow diagram of the preferred method of the invention for designing translation tables for a PCM modem including a PCM modem subject to alternating robbed bit signaling.

According to a second aspect of the invention, DIL sequence signals for frames of the alternating robbed bit signaling slot having LSB=0 and LSB=1 are accumulated separately in order to generate two translation tables (TRT0, TRT1) for that slot. Where the DIL sequence is found only in the frames having the alternating robbed bit signaling slot having LSB=0 or having LSB=1, only one translation table can be generated. More particularly, as seen in FIG. 2, the method of the invention for generating translation tables is shown. It will be appreciated that all the methods of the invention may be carried out utilizing one or more of hardware, firmware or software (typically involving one or more of microprocessors, DSPs, and memory). The incoming signal is assumed to be a DIL probing signal which has been equalized and subject to automatic gain control (AGC). At 110, a determination is made (as discussed above with reference to FIG. 1) whether any of the slots are subjected to alternating robbed bit signaling. If at least one slot is subject to ARBS, that information is forwarded to the translation table design step 100a (or 100b) as discussed in more detail below.

At 115, the DIL signal is separated slot by slot (typically six slots) into tables which are preferably ordered and stored. At 120, tables of distances between the levels are calculated and stored. Thus, where all one hundred twenty-eight values are sent and stored for a slot in a table at step 115, one hundred twenty-seven distances would be calculated for that slot and stored in a table at step 120. Based on the distances, and according to a method discussed in previously incorporated U.S. Ser. Nos. 09/238,319, 09/238,320, 09/238,321 and 09/238,302, a determination is made at 125 as to whether the slot has been subjected to robbed bits or not.

According to the preferred embodiment of the invention, at 130 a determination is made as to the number of slots which are subject to robbed bit signaling (including ARBS). If the number of robbed bit slots is five or six (i.e., there is only one or zero non-robbed bit slots), at 135 six sets of candidate scaling factors Scf are calculated (one set for each of the six slots) according to a method discussed in more detail in previously incorporated U.S. Ser. Nos. 09/238,319, 09/238,320, 09/238,321 and 09/238,302. The six sets of candidate scaling factors are provided as one input to the PAD estimation and final scaling factor selection at 180 as discussed below. In addition, at 140, the slot having the largest number of "typical" points (as discussed below) is chosen. The distances calculated at step 120 for that slot are then used in a determination made at step 145 as to whether A-law or $\mu$-law is being utilized, as discussed in more detail in previously incorporated U.S. Ser. Nos. 09/238,319, 09/238,320, 09/238,321 and 09/238,302, and that determination is provided to the PAD estimation and final scaling factor selection step 180. Where A-law is being utilized, at step 150, that fact is forwarded to step 100b where the translation tables are designed. If $\mu$-law is being utilized, a determination is made at 155 (and utilizing the tables stored at 115) as set forth in detail in previously incorporated U.S. Ser. Nos. 09/238,319, 09/238,320, 09/238,321 and 09/238, 302, as to whether robbed bit or half robbed bit signaling is being utilized in each slot. The results are forwarded to the translation table design step 100b, as are the six tables of levels stored at step 115.

Returning to step 140, the slot chosen as having the largest number of typical distances (typically a non-robbed bit slot) is used in a PAD-estimation algorithm in determining the likely PAD impairment of the channel and in determining a final scaling factor at 180 (as discussed in detail in previously incorporated U.S. Ser. Nos. 09/238,319, 09/238,320, 09/238,321 and 09/238,302. The result of that determination is provided to the translation table design step 100b (as well as translation table design step 10a). As seen in FIG. 2, the translation table design conducted at 100b also utilizes the tables determined at 115, the A-law/$\mu$-law determination of step 150, and the robbed-bit/half-robbed-bit determination of step 155.

Returning to step 130, when it is determined that fewer than five slots are subjected to robbed bit signaling, then candidate average scaling factors are calculated at 160 according to methods discussed in detail in previously incorporated U.S. Ser. Nos. 09/238,319, 09/238,320, 09/238, 321 and 09/238,302, and the candidate average scaling factors are forwarded to step 80. As seen in FIG. 2, in calculating the average scaling factor, certain information is required. Thus, at 165, using information from step 125 as to which slots are not subject to robbed bit signaling, and the tables of levels for those slots (from step 115), a table of average levels for the non-robbed-bit slots is calculated. Using the average levels calculated at 165, a table of distances between the average levels is calculated at 170. The table of distance between average levels is utilized at 160 in calculating an average scaling factor as discussed in detail in previously incorporated U.S. Ser. Nos. 09/238,319, 09/238,320, 09/238,321 and 09/238,302. The table of average levels for the non-robbed-bit slots calculated at 165 is also utilized at step 175. In particular, at step 175, a new set of six tables of levels is stored, where for each non-robbed-bit slot, the table stored for that slot at step 115 is utilized; and where for each robbed-bit slot, the table of average levels calculated at step 165 is utilized in lieu of the table stored at step 115. These tables are utilized in the PAD estimation and final scaling factor selection step 180 as discussed in detail in previously incorporated U.S. Ser. Nos. 09/238,319, 09/238,320, 09/238,321 and 09/238,302.

The table of average levels for non-robbed-bit slots calculated at 165 and used in generating the set of six tables at step 175, is also utilized in the algorithm at step 190 in distinguishing whether A-law or $\mu$-law is being utilized. The determination of step 190 is provided to the PAD estimation and final scaling factor selection step 180. In addition, where A-law is being utilized, at step 195, that fact is forwarded to step 100a where the translation tables are designed. If μ-law is being utilized, a determination is made at 197 (and utilizing the tables stored at 175) as to whether robbed bit or half robbed bit signaling is being utilized in each slot (as discussed in detail in previously incorporated U.S. Ser. Nos. 09/238,319, 09/238,320, 09/238,321 and 09/238,302). The results are forwarded to the translation table design step 100a, as are the six tables of levels stored at step 175.

As previously discussed, where one or more of the slots are subjected to ARBS, that information is forwarded to steps 100a and 10b. In designing the translation table for that slot, the DIL sequence signals for frames of the alternating robbed bit signaling slot having LSB=0 and LSB=1 are accumulated separately in order to generate two translation tables (TRT0, TRT1) for that slot. Thus, potentially up to twelve translation tables can be generated at steps 100a or 100b. Where the DIL sequence for a slot subject to ARBS includes information only with respect to frames having LSB=0 or LSB=1, it will be appreciated that only a single translation table is generated for that slot.

Figure 3:
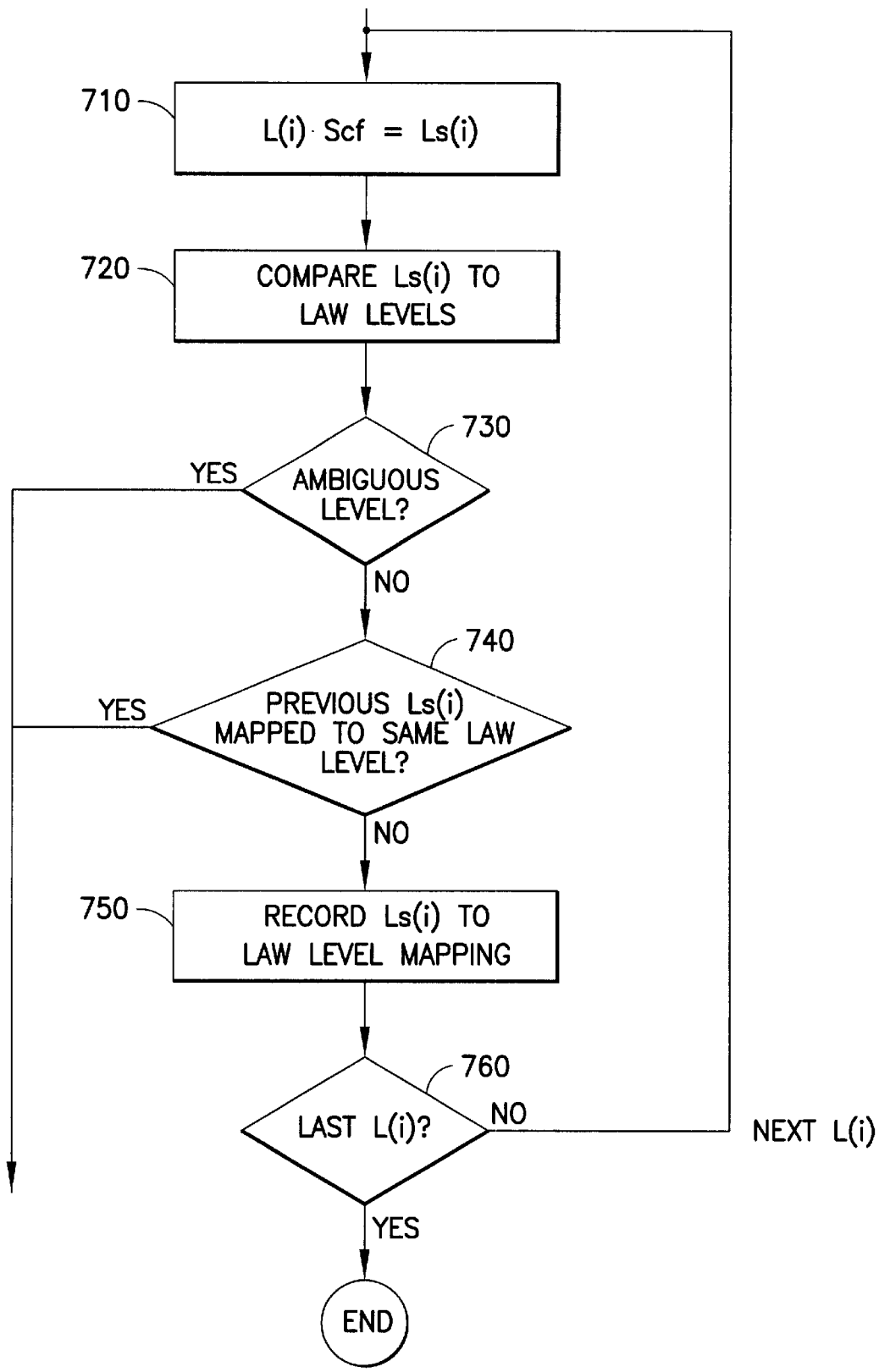
FIG. 3 is a flow diagram of the preferred method of the invention of generating the translation tables of FIG. 2.

Turning to FIG. 3, details of how the translation tables are generated is seen. Thus, at 710, for each slot, and separately for LSB=0 and LSB=1 frames of an ARBS slot, each level of the received probing signal L(i) is multiplied by the final scaling factor Scf for that slot (determined at 180) to provide a scaled level (Ls(i)). As seen in FIG. 2, the levels L(i) are obtained from either the tables of levels 115 in the case of five or more robbed bit slots, or from the substitute tables of levels 175 in the case of less than five robbed bit slots. Then, at 720, the scaled levels Ls(i) for that slot are compared to the standard values of its appropriate slot-type (A-law, μ-law α-codec, or μ-law β-codec). If the scaled level is within a predetermined percent (e.g., 5%) on either side of a midpoint between adjacent standard values, at 730, that point is discarded (or declared unavailable for use in the constellation). Likewise, as indicated at 740, if more than one scaled level Ls(i) maps to a single standard value, only one of the scaled levels may be utilized in the constellation, and the other(s) should be declared unavailable or discarded. Otherwise, the closest standard level is recorded as usable at 750. As indicated at 760, steps 710–750 are preferably conducted on all levels L(i) of the received probing signal.

Figure 4:
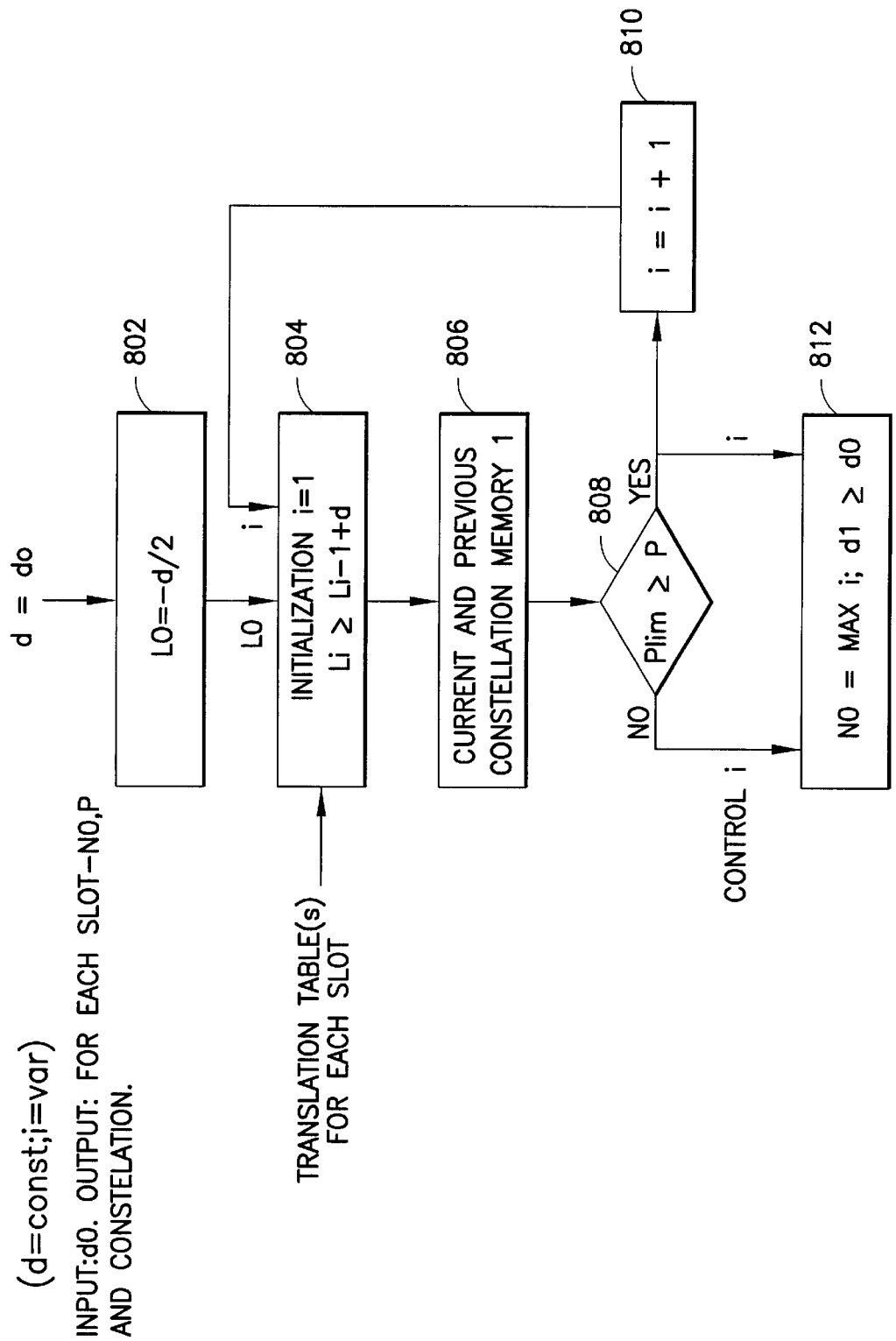
FIG. 4 is a flow chart illustrating the preferred method of constellation design according to the invention.
Figures 5A, 5B:
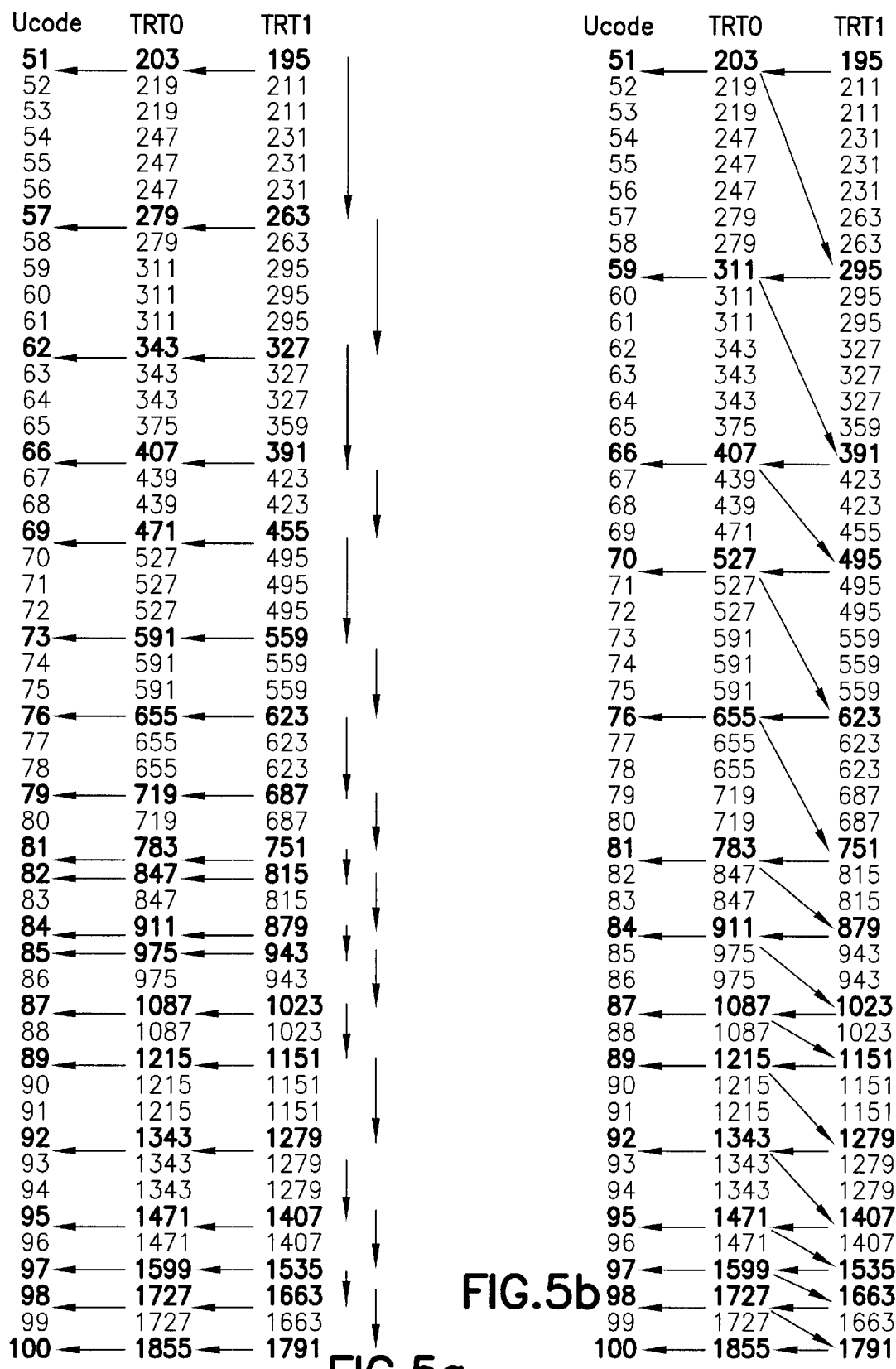
FIGS. 5a and 5b are tables illustrating first and second embodiments of generating a constellation design from two translation tables generated for an alternating robbed bit slot.

According to a third aspect of the invention, different algorithms are provided for designing a constellation for the alternating robbed bit signaling slot depending on (a) whether two translation tables were generated for the slot, (b) whether the frame-to-TRT correspondence is known, and (c) where only one translation table is generated, whether the translation table generated was TRT0 or TRT1. Where two translation tables were generated, and the frame-to-TRT correspondence is known, constellation points are selected utilizing a minimum distance (dmin) between levels of table TRT1. More particularly, as seen in FIG. 4, a preliminary constellation is generated on a per-slot basis (with two constellations for each ARBS where two translation tables were generated and the frame-to-TRT correspondence is known). Thus, on a per-slot basis, an initialization level L0 for a constellation is generated at step 802 by setting the L0 equal to −d/2, where d is initially set to the minimum distance d0. For the ARBS slot(s), according to the invention, the initialization level L0 is preferably chosen from translation table TRT1 corresponding to that slot. At step 804, a first (and subsequent) level value (Li=L1) from the translation table for that slot is chosen for the constellation by picking a level value equal to or just exceeding Li−1 (L0) plus d0. For the ARBS slot(s), the first level value from TRT1 is chosen the same way; and the first level from TRT0 (for the second constellation for that slot) is obtained by finding the TRT0 level corresponding to the same Ucode as the first level value chosen from TRT1 (as seen in FIG. 5a); i.e., the Ucodes for the selected levels in TRT1 are used to identify selected levels from table TRT0. Thus, for all slots, the closest level value in the translation table which exceeds d0/2 will be taken as the first point of the constellation, thereby ensuring that the distance between that point and its negative will be at least the minimum distance d required to meet performance requirements. At 806, the level value is placed in the "current" constellation memory for that slot, and at 808, the average power of all points (initially only one point) in the "current" constellation memory is compared to a power limit Plim. For each ARBS slot, the average power of the two constellations generated for that slot is utilized in the average power calculation. If the average power of all points in the current constellation memory is less than the power limit, the index i is incremented at 810, and the method continues at 804 with another level value being chosen from the translation table. As level values Li are chosen and added to the current constellation memory at 806, the "previous" constellation is also stored at 806 in case the average power of the points in the current constellation exceed the power limit as determined at 808. If the average power of the points in the current constellation exceeds the power limitation, then the "previous" constellation is stored as a preliminary constellation at 812. In addition, the number of non-negative levels (points) N0 in the constellation is stored (which is equal to the final or maximum index i), as is the minimum distance d1 between points chosen for the constellation.

While steps 802–812 provide a first "cut" at generating constellations for the slots, various optimization techniques described in previously incorporated U.S. Ser. Nos. 09/238, 319, 09/238,320, 09/238,321 and 09/238,302 can be used to improve the constellations. These techniques also apply to the constellations generated for the ARBS slots.

It should be appreciated that the method for designing a constellation discussed above with reference to FIG. 4 will provide two sets of references for the receiver in the ARBS case. The first set of references comes from TRT0 and the second set comes from TRT1. If a given frame has LSB=0, the receiver uses references from TRT0; whereas if a given frame has LSB=1, the receiver uses references from TRT1. As a result, and in accord with the invention, the receiver saves these two sets of references, and switches these sets synchronously with the corresponding frames, while the transmitting modem is provided with a single set of Ucodes for that ARBS slot.

Where two translation table were generated, but the frame-to-TRT correspondence is not known, according to the invention, and as seen in FIG. 5b, a first constellation point is selected from table TRT1 utilizing the required minimum distance (dmin) between levels of table TRT1. The Ucode for the selected level in TRT1 is used to identify a selected level from table TRT0. However, in contrast with the embodiment of FIG. 5a, the next constellation point in TRT1 is selected by finding the next constellation point in table TRT1 a minimum distance from the previous selected level in table TRT0 (as indicated by the diagonal arrows of FIG. 5b). The Ucode for that next selected point is used to identify another selected level from table TRT0 (as indicated by the horizontal arrows of FIG. 5b). Additional constellation points are selected in this manner until the average power of the transmitted signal for the alternating robbed bit signaling slot (including both sets of selected levels) exceeds a given threshold. As a result, a single set of Ucodes for the alternating robbed bit slot is provided for the transmitting modem, while two sets of references are provided for the receiving modem. However, since the two sets of references cannot be correlated to the received frames, a double decision is required by the receiving modem.

Where only a single translation table is generated, a constellation is designed using only that translation table. The result is a set of Ucodes for the transmitter and a first set of references for the receiver. Then, as seen in FIG. 5c, for each level from the first set of references, the same level is found in a µ-law table (as indicated by the diagonal arrows). If the translation table available is TRT0, the next smaller level in the µ-law table is taken as a point for the second set of references (as indicated by the vertical arrows pointing up); whereas, if the translation table available is TRT1, the next larger level in the µ-law table is taken as a point for the second set of references (as indicated by the vertical arrows pointing down). The selection of the constellation levels continues until the average power of transmitted signals for the alternating robbed bit slot exceeds a given threshold.

More particularly with respect to FIG. 5c, the first column (left to right) is the Ucode, the second and fourth columns are µ-law levels, and the third and fifth columns are TRT0 and TRT1 translation table levels for a −3 dB PAD channel. The sets of constellation points, including the first set and the second set of references, as well as the corresponding Ucode for the transmitter, are designated by underlined numbers for TRT0 and by bold numbers for TRT1.

Assuming that TRT0 was obtained for an ARBS, and TRT0 level 375 (Ucode 65) has been already taken as a constellation level, the same level in the µ-law table is found (see diagonal arrow). The next smaller level in the µ-law table (up vertical arrow) is level 359 which is the second (TRT1) reference for Ucode 65. If $d_{min}=64$, the next constellation level in TRT0 will be 439 (Ucode 67). Repeating the above procedure, level 423 will be generated as the second reference for Ucode 67.

Similarly, assuming that TRT1 was obtained for an ARBS, and TRT1 level 327 (Ucode=62) has been already taken as a constellation level, the same level in the µ-law table is found (see diagonal arrow). The next larger level in the µ-law table (down vertical arrow) is level 343 which is the second (TRT0) reference for Ucode 62. If $d_{min}=64$, the next constellation level in TRT1 will be 391 (Ucode 66). Repeating the above procedure, level 407 will be generated as the second reference for Ucode 66.

There have been described and illustrated herein methods for the design of translation tables and constellations in a PCM modem receiver subject to alternating robbed bit signaling. While particular embodiments of the invention has been described, it is not intended that the invention be limited thereto, as it is intended that the invention be as broad in scope as the art will allow and that the specification be read likewise. Thus, while various aspects of the methods of the invention have been described as being conducted in separate steps according to a particular order, it will be appreciated that in many cases the order of steps is not necessarily critical, and that various steps can be combined or subdivided as desired. Also, while the invention was described with particular reference to a six slot frame for V.90 modems, it will be appreciated that various aspects of the invention have applicability to other digital modems which may have a different number of slots. Further, while the invention was described primarily with respect to software flow charts, it will be appreciated that the invention can be carried out in apparatus including hardware, firmware, software, or a combination thereof as is well known in the art. It will therefore be appreciated by those skilled in the art that yet other modifications could be made to the provided invention without deviating from its spirit and scope as so claimed.

We claim:

1. In a PCM modem having a receiver for receiving PCM signals according to a frame containing a plurality of slots, an improvement comprising:
   a) means for receiving a training signal in said plurality of slots over a plurality of frames;
   b) means for finding average values ($L_s$) of portions of the training signal in each of said plurality of slots over said plurality of frames, and for finding average received levels ($L_{sf}$) for each of said plurality of slots in each of said plurality of frames;
   c) means for comparing each $L_{sf}$ of each slot with the $L_s$ of that slot to obtain a plurality of difference values ($D_{sf}$) for each slot;
   d) means for comparing said plurality of difference values of each slot to a threshold (Th), and for determining whether a given slot is subject to alternating robbed bit signaling based on magnitudes of said difference values for that slot and the magnitude of said threshold.

2. In a PCM modem according to claim 1, wherein:
said plurality of slots comprises six slots, and
said plurality of frames comprises at least four frames.

3. In a PCM modem according to claim 1, wherein:
said means for determining determines that a robbed bit pattern for a frame is LSB (least significant bit )=0 when $D_{sf}>Th$.

4. In a PCM modem according to claim 1, wherein:
said means for determining determines that a robbed bit pattern for a frame is LSB (least significant bit)=1 when $D_{sf}<-Th$.

5. In a PCM modem according to claim 1, wherein:
said means for determining determines that a slot is subject to alternating robbed bit signaling when $|D_{sf}|>Th$.

6. In a PCM modem according to claim 1, wherein:
said means for receiving a training signal includes means for receiving a digital impairment learning (DIL) signal sequence, said improvement further comprising
   e) translation table generation means for generating two translation tables (TRT0, TRT1) for a single said slot subject to alternating robbed bit signaling (ARBS).

7. In a PCM modem according to claim 6, wherein:
said translation table generation means utilizes said values of said DIL sequence in said slot subject to ARBS in at least a first frame to generate a first of said two translation tables, and utilizes said values of said DIL sequence in said slot subject to ARBS in at least a second frame other than said first frame to generate a second of said two translation tables.

8. In a PCM modem according to claim 6, said improvement further comprising:
   f) means for generating two constellations from said two translation tables, a first of said two constellations corresponding to an ARBS slot with LSB=0, and a second of said two constellations corresponding to an ARBS slot with LSB=1.

9. In a PCM modem according to claim 8, wherein:
said means for generating comprises means for selecting a first point from a first of said two translation tables for a first constellation, said first point corresponding to a first universal code (Ucode), and selecting a corresponding first point from a second of said two translation tables for a second constellation, said corresponding first point corresponding to said first Ucode.

10. In a PCM modem according to claim 9, wherein:
said first of said two translation tables is said TRT1 table corresponding to LSB=1.

11. In a PCM modem according to claim 9, wherein:
said means for selecting selects a second point for said first constellation by finding a second point in said first of said two translation tables at least a minimum distance from said first point, said second point corresponding to a second Ucode, and selecting a corresponding second point from said second of said two translation tables for said second constellation, said corresponding second point corresponding to said second Ucode.

12. In a PCM modem according to claim 11, wherein:
said means for selecting selects a second point for said first constellation by finding a second point in said first of said two translation tables at least a minimum distance from said corresponding first point of said second constellation, said second point corresponding to a second Ucode, and selecting a corresponding second point from said second of said two translation tables for said second constellation.

13. In a PCM modem according to claim 1, wherein:
said means for receiving a training signal includes means for receiving a digital impairment learning (DIL) signal sequence, said improvement further comprising
e) translation table generation means for generating at least one of two translation tables (TRT0, TRT1) for said slot subject to alternating robbed bit signaling (ARBS).

14. In a PCM modem according to claim 13, said improvement further comprising:
f) means for generating two constellations from said at least one translation table.

15. In a PCM modem according to claim 14, wherein:
said at least one translation tables is said TRT1 table corresponding to LSB=1, and
said means for generating comprises means for selecting a first point from said TRT1 table for a first constellation, said first point corresponding to a first universal code (Ucode), and selecting a corresponding first point for a second constellation by finding a $\mu$-law value of said first point, and by using a next larger $\mu$-law value for said corresponding first point for said second constellation.

16. In a PCM modem according to claim 15, wherein:
said means for selecting selects a second point for said first constellation by finding a second point in said TRT1 table at least a minimum distance from said first point, said second point corresponding to a second Ucode, and selecting a corresponding second point for a second constellation by finding a $\mu$-law value of said second point, and by using a next larger $\mu$-law value for said corresponding second point for said second constellation.

17. In a PCM modem according to claim 14, wherein:
said at least one translation tables is said TRT0 table corresponding to LSB=0, and
said means for generating comprises means for selecting a first point from said TRT0 table for a first constellation, said first point corresponding to a first universal code (Ucode), and selecting a corresponding first point for a second constellation by finding a $\mu$-law value of said first point, and by using a next smaller $\mu$-law value for said corresponding first point for said second constellation.

18. In a PCM modem according to claim 17, wherein:
said means for selecting selects a second point for said first constellation by finding a second point in said TRT0 table at least a minimum distance from said first point, said second point corresponding to a second Ucode, and selecting a corresponding second point for a second constellation by finding a $\mu$-law value of said second point, and by using a next smaller $\mu$-law value for said corresponding second point for said second constellation.

19. A method in a PCM modem having a frame containing a plurality of slots, comprising:
a) receiving a training signal in said plurality of slots over a plurality of frames;
b) finding average values ($L_s$) of portions of the training signal in each of said plurality of slots over said plurality of frames, and average received levels ($L_{sf}$) for each of said plurality of slots in each of said plurality of frames;
c) comparing each $L_{sf}$ of each slot with the $L_s$ of that slot to obtain a plurality of difference values ($D_{sf}$) for each slot; and
d) comparing said plurality of difference values of each slot to a threshold (Th), and determining whether a given slot is subject to alternating robbed bit signaling based on magnitudes of said difference values for that slot and the magnitude of said threshold.

20. A method according to claim 19, wherein:
said plurality of slots comprises six slots, and
said plurality of frames comprises at least four frames.

21. A method according to claim 19, wherein:
said determining determines that a robbed bit pattern for a frame is LSB (least significant bit )=0 when $D_{sf}$>Th.

22. A method according to claim 19, wherein:
said determining determines that a robbed bit pattern for a frame is LSB (least significant bit)=1 when $D_{sf}$<-Th.

23. A method according to claim 19, wherein:
said determining determines that a slot is subject to alternating robbed bit signaling when $|D_{sf}|$>Th.

24. A method according to claim 19, further comprising:
receiving a digital impairment learning (DIL) signal sequence; and
generating two translation tables (TRT0, TRT1) for a single said slot subject to alternating robbed bit signaling (ARBS) utilizing said DIL sequence.

25. A method according to claim 24, wherein:
said generating comprises utilizing values of said DIL sequence in said slot subject to ARBS in at least a first frame to generate a first of said two translation tables, and utilizing values of said DIL sequence in said slot subject to ARBS in at least a second frame other than said first frame to generate a second of said two translation tables.

26. A method according to claim 24, further comprising:
generating two constellation m said two translation tables, a first of said two constellations corresponding to an ARBS slot with LSB=0, and a second of said two constellations corresponding to an ARBS slot with LSB=1.

27. A method according to claim 26, wherein:
said generating comprises selecting a first point from a first of said two translation tables for a first constellation, said first point corresponding to a first universal code (Ucode), and selecting a corresponding first point from a second of said two translation tables for a second constellation, said corresponding first point corresponding to said first Ucode.

28. A method according to claim 27, wherein:
said first of said two translation tables is said TRT1 table corresponding to LSB=1.

29. A method according to claim 27, wherein:
said selecting comprises selecting a second point for said first constellation by finding a second point in said first of said two translation tables at least a minimum distance from said first point, said second point corresponding to a second Ucode, and selecting a corresponding second point from said second of said two translation tables for said second constellation, said corresponding second point corresponding to said second Ucode.

30. A method according to claim 29, wherein:
said selecting comprises selecting a second point for said first constellation by finding a second point in said first of said two translation tables at least a minimum distance from said corresponding first point of said second constellation, said second point corresponding to a second Ucode, and selecting a corresponding second point from said second of said two translation tables for said second constellation.

31. A method according to claim 19, further comprising:
receiving a digital impairment learning (DIL) sequence; and
generating at least one of two translation tables (TRT0, TRT1) for said slot subject to alternating robbed bit signaling (ARBS) by utilizing said DIL sequence.

32. A method according to claim 31, further comprising:
generating two constellations from said at least one translation table.

33. A method according to claim 32, wherein:
said at least one translation tables is said TRT1 table corresponding to LSB=1, and
said generating comprises selecting a first point from said TRT1 table for a first constellation, said first point corresponding to a first universal code (Ucode), and selecting a corresponding first point for a second constellation by finding a $\mu$-law value of said first point, and by using a next larger $\mu$-law value for said corresponding first point for said second constellation.

34. A method according to claim 33, wherein:
said selecting comprises selecting a second point for said first constellation by finding a second point in said TRT1 table at least a minimum distance from said first point, said second point corresponding to a second Ucode, and selecting a corresponding second point for a second constellation by finding a $\mu$-law value of said second point, and by using a next larger $\mu$-law value for said corresponding second point for said second constellation.

35. A method according to claim 32, wherein:
said at least one translation tables is a TRT0 table, and
said selecting comprises selecting a first point from said TRT0 table for a first constellation, said first point corresponding to a first Ucode, and selecting a corresponding first point for a second constellation by finding a $\mu$-law value of said first point, and by using a next smaller $\mu$-law value for said corresponding first point for said second constellation.

36. A method according to claim 35, wherein:
said means for selecting selects a second point for said first constellation by finding a second point in said TRT0 table at least a minimum distance from said first point, said second point corresponding to a second Ucode, and selecting a corresponding second point for a second constellation by finding a $\mu$-law value of said second point, and by using a next smaller $\mu$-law value for said corresponding second point for said second constellation.

37. In a PCM modem having a receiver for receiving PCM signals according to a frame containing a plurality of slots, an improvement comprising:
a) means for receiving a training signal in said plurality of slots over a plurality of frames;
b) means for finding average values ($L_s$) of portions of the training signal in a slot over said plurality of frames, and for finding an average received level ($L_{sf}$) for said slot;
c) means for comparing each $L_{sf}$ with the $L_s$ of said slot to obtain a plurality of difference values ($D_{sf}$) for said slot;
d) means for comparing said plurality of difference values of said slot to a threshold (Th), and for determining whether said slot is subject to alternating robbed bit signaling based on magnitudes of said plurality of difference values and the magnitude of said threshold.

38. A method in a PCM modem having a frame containing a plurality of slots, comprising:
a) receiving a training signal in said plurality of slots over a plurality of frames;
b) finding average values ($L_s$) of portions of the training signal in a slot over said plurality of frames, and finding an average received level ($L_{sf}$) for said slot;
c) comparing each $L_{sf}$ with the $L_s$ of said slot to obtain a plurality of difference values ($D_{sf}$) for said slot;
d) comparing said plurality of difference values of said slot to a threshold (Th), and determining whether said slot is subject to alternating robbed bit signaling based on magnitudes of said plurality of difference values and the magnitude of said threshold.

* * * * *